United States Patent [19]

Logsdon et al.

[11] Patent Number: 4,598,361

[45] Date of Patent: Jul. 1, 1986

[54] ALLOCATOR FOR A REDUCTION PROCESSOR EVALUATING PROGRAMS STORED AS BINARY DIRECTED GRAPHS EMPLOYING VARIABLE-FREE APPLICATIVE LANGUAGE CODES

[75] Inventors: Gary L. Logsdon; Mark R. Scheevel; Frank A. Williams, Jr., all of Austin, Tex.

[73] Assignee: Burroughs Corporation, Detroit, Mich.

[21] Appl. No.: 690,846

[22] Filed: Jan. 11, 1985

[51] Int. Cl.⁴ .............................................. G06F 1/00
[52] U.S. Cl. ................................................... 364/200
[58] Field of Search .......... 364/200 MS File, 900 MS FILE

[56] References Cited

U.S. PATENT DOCUMENTS

4,435,752 3/1984 Winkelman ...................... 364/200

Primary Examiner—Raulfe B. Zache
Attorney, Agent, or Firm—Mervyn L. Young; Kevin R. Peterson

[57] ABSTRACT

An allocator for a reduction processor which evaluates programs stored as binary graphs employing variable-free applicative language codes. These graphs are made up of nodes, each of which exists in memory and contains as its most significant bit a mark bit which when set indicates that the node is being used in a graph and when reset indicates that the node or storage location is available for future use by the processor. The allocator scans selected groups of storage locations in parallel to see if there are any unused storage locations and then places the addresses of those unused storage locations in a queue for use by the processor.

10 Claims, 14 Drawing Figures

ABSTRACT

ALLOCATOR FOR A REDUCTION PROCESSOR EVALUATING PROGRAMS STORED AS BINARY DIRECTED GRAPHS EMPLOYING VARIABLE-FREE APPLICATIVE LANGUAGE CODES

RELATED U.S. PATENT APPLICATIONS

U.S. patent applications directly or indirectly related to the subject application are as follows:

Ser. No. 617,526, filed June 5, 1984, by Gary E. Logsdon, et al. and entitled "Graph Manager for a Reduction Processor Evaluating Programs Stored as Binary Directed Graphs Employing Variable-Free Applicative Language Codes";

Ser. No. 617,531, filed June 5, 1984, by Gary E. Logsdon, et al. and entitled "Parallel Register Transfer Mechanism for a Reduction Processor Evaluating Programs Stored as Binary Directed Graphs Employing Variable-Free Applicative Language Codes";

Ser. No. 617,532, filed June 5, 1984, by Gary E. Logsdon, et al. and entitled "Condition Concentrator and Central Store for a Reduction Processor Evaluating Programs Stored as Binary Directed Graphs Employing Variable-Free Applicative Language Codes";

Ser. No. 690,842, filed Jan. 11, 1985, by Gary E. Logsdon, et al. and entitled "System Memory for a Reduction Processor Evaluating Programs Stored as Binary Directed Graphs Employing Variable-Free Applicative Language Codes".

BACKGROUND OF THE INVENTION

1. Field of the Invention

This invention relates to a system memory and allocator for a digital processor which is adapted to evaluate programs represented as binary directed graphs, and more particularly to a processor that evaluates such graphs by progressive substitutions of equivalent graphs.

2. Description of the Prior Art

Most digital computers on the market today are still of the type first postulated by John von Neumann and are sequential in their execution of commands. The first higher-level languages for programming computers, such as FORTRAN and COBOL, reflected this organization, and left with the programmer the responsibilities of storage management and control-flow management, as well as the design of the algorithm to be implemented by the computer. Pure applicative languages, such as pure LISP, differ from imperative languages by relieving the programmer of these management responsibilities.

An alternative to pure LISP is the Saint Andrews Static Language, or SASL, which was developed by David A. Turner (*SASL Language Manual*, University of St. Andrews, 1976). By introducing a number of constants called "combinators", this language may be transformed into a variable-free notation (D. A. Turner, "A New Implementation Technique for Applicative Languages", *Software—Practice and Experience*, Vol. 9, pp. 31-49, 1979). This notation is particularly advantageous for handling higher-order functions (which may take functions as arguments and return functions as results) and non-strict functions (which may return a result even if one or more arguments are undefined).

The implementation technique developed by Turner employs a set of primitive functions such as plus, minus, and so forth, and a set of combinators, which are higher-order non-strict functions. These operators are formally defined by substitution rules, some examples of which are

```
S f g x = f x (g x)
K x y = x
I x = x
Y h = h (Y h)
C f x y = f y x
B f g x = f (g x)
   cond p x y = x , if p is true
                y , if p is false
   plus m n = r , where m and n must already have been
                  reduced to numbers and r is the sum
                  of m and n
```

Other combinators and their definitions are to be found in the above referenced Turner publication.

This combinator notation may be conveniently represented as a binary directed graph in which each node represents the application of a function to an argument. (These graphs are known as SK-graphs from the names of the first two combinators.) The substitution rules may then be interpreted as graph transformation rules, and these graphs (and, therefore, the programs they represent) may be evaluated, in a process known as reduction, by a processor of a fairly simple nature. Such a reduction processor is disclosed in the Bolton et al. U.S. Pat. No. 4,447,875, entitled "Reduction Processor for Executing Programs Stored as Treelike Graphs Employing Variable-Free Applicative Language Codes".

Details of the reduction process can be found in the Turner paper, but a brief example is helpful. FIGS. 1A-D illustrate the reduction of a graph representing the SASL program.

```
successor 2
WHERE
successor x = 1 + x
```

This program is translated (compiled) into the combinator expression

Figure 1A:
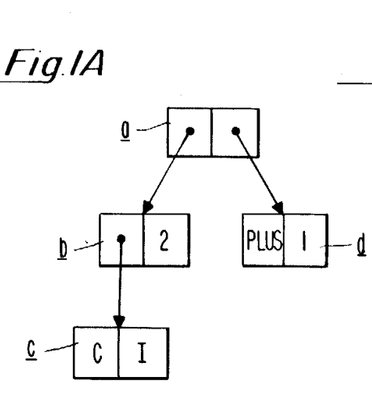
FIGS. 1A, B, C, and D represent binary directed graphs of the type for which the present invention is intended.
Figure 1B:
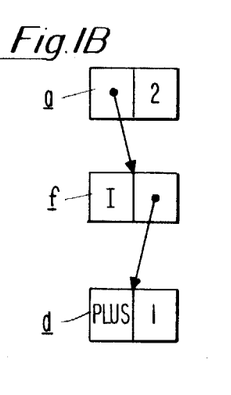
Figure 1C:
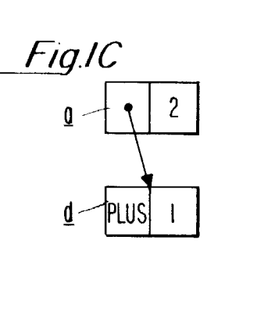
Figure 1D:
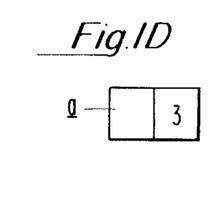

C I 2 (plus 1)

that is represented by the graph in FIG. 1A. Successive transformations of this graph yield

| I (plus 1) 2 | using the C rule (FIG. 1B) |
| plus 1 2     | using the I rule (FIG. 1C) |
| 3            | using the plus rule (FIG. 1D) |

The substitutions performed to reduce a graph require the manipulation of a number of different pieces of data, such as pointers and combinator codes, which are shifted from one location to another in a register file. In the embodiment disclosed in the above referenced Bolton et al. application, each graph-reduction step required a sequence of register-file transfers. In many cases, however, the required transfers between registers could be performed simultaneously, with a consequent increase in speed.

After performing one of these transformations, the processor must traverse the graph in search of the next transformation site (called a "redex"). During this search nodes are examined and a variety of tests are performed, such as determining whether the left side of a node represents a pointer or a combinator. Again, in the machine described in the Bolton et al. application, these tests must be made sequentially: in many cases, though, these tests could be performed simultaneously.

It is then an object of the present invention to provide an improved processing system for the evaluation of binary directed graphs through a series of substitutions.

It is another object of the present invention to provide such a processor wherein each substitution can be accomplished faster by a number of simultaneous register transfers.

It is still a further object of the present invention to provide an allocator and system memory for such a reduction processor where the allocator selects addresses of new nodes for transfer to the reduction processor for use in evaluating the respective graphs.

SUMMARY OF THE INVENTION

To accomplish the above-identified objects, the present invention resides in an allocator and system memory for employment in an applicative language reduction processor. The allocator is coupled to the system memory to select addresses of new nodes on the system memory as required for a function substitution.

A feature then in the present invention resides in an allocator and system memory for a reduction processor intended for evaluating applicative language programs represented as binary directed graphs.

BRIEF DESCRIPTION OF THE DRAWINGS

The above and other objects, advantages, and features of the present invention may become readily apparent from a review of the following specification when taken in conjunction with the drawings wherein.

GENERAL DESCRIPTION OF THE INVENTION

Figure 2:
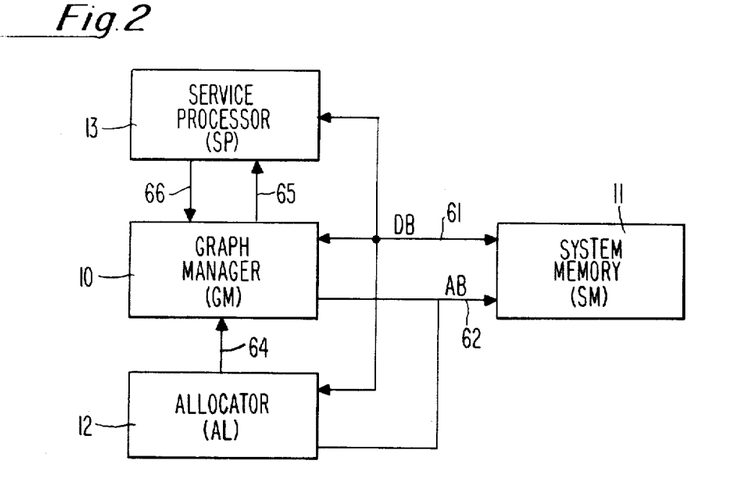
FIG. 2 illustrates a system employing the present invention.

The system employing the present invention is illustrated in FIG. 2. The principal element is graph manager 10, which contains a data section which caches some of the nodes of a graph that is to be reduced and allows for those nodes to be manipulated to perform the series of substitutions required for the graph reduction. The system includes a system memory 11 which provides storage for all of the nodes of the graph and allocator 12 which scans the system memory for unused words whose addresses it queues for use by the graph manager. The allocator also maintains a count of the number of addresses queued. Service processor 13 supports a wide variety of data transfers to a host processor (not shown); it also provides a floating point arithmetic facility.

A particular problem with the graph reduction techniques of prior art systems can be better illustrated with reference again to FIGS 1A–D. It will be appreciated that in the transformation of the graph in FIG. 1A to that of FIG. 1B, the contents of the right cell of node b must be transferred to the right cell of node a, the right cell of node c must be transferred to the left cell of node f and the right cell of node a must be transferred to the right cell of node f. In prior art reduction processors, this series of transfers was performed sequentially, and a similar series of transfers was performed to reduce the graph of FIG. 1B to that of FIG. 1C and so on. It is the purpose of the present invention to provide a parallel register-transfer mechanism by which each sequence of register transfers may be performed simultaneously, thus speeding up the reduction process.

A further problem with prior art systems relates to testing of conditions that guide the reduction process. Before the redex of FIG. 1A can be transformed, the processor must determine that several conditions hold. In prior art processors, these conditions are tested sequentially and the result of each test is used to select one path of a two-way branch. It is another purpose of the present invention to provide a condition testing mechanism by which several conditions may be tested simultaneously to select a single path of a multi-way branch.

DETAILED DESCRIPTION OF THE INVENTION

Figure 3:
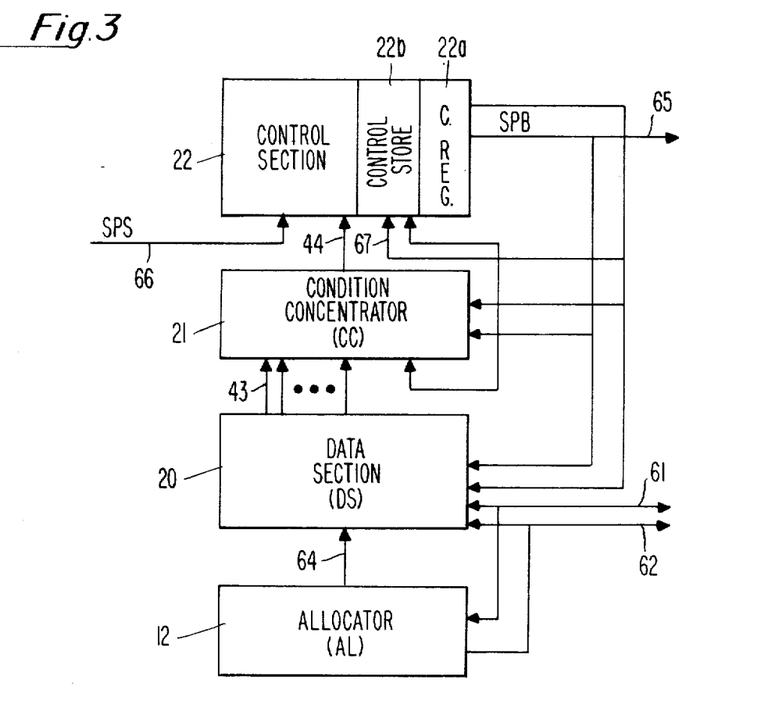
FIG. 3 is a diagram of the graph manager section of the present invention.

Graph manager 10 of FIG. 2 is shown in slightly more detail in FIG. 3, including its communications with allocator 12. The graph manager includes data section 20, condition concentrator 21, and control section 22.

Data section 20 stores a portion of the graph being reduced and allows fields to be transferred between various registers therein concurrently. Values of some of these fields are sent to condition concentrator 21 for reasons that will be described below. This data section is shown in more detail in FIG. 4.

Control section 22 is a simple state machine with a writable control store 22b in which the microprogram for the state machine is stored. Microinstruction addresses are generated by concatenating the displacement field received from condition concentrator 21 with the next-address field in control register 22a, which in turn receives the selected microinstruction.

Figure 4:
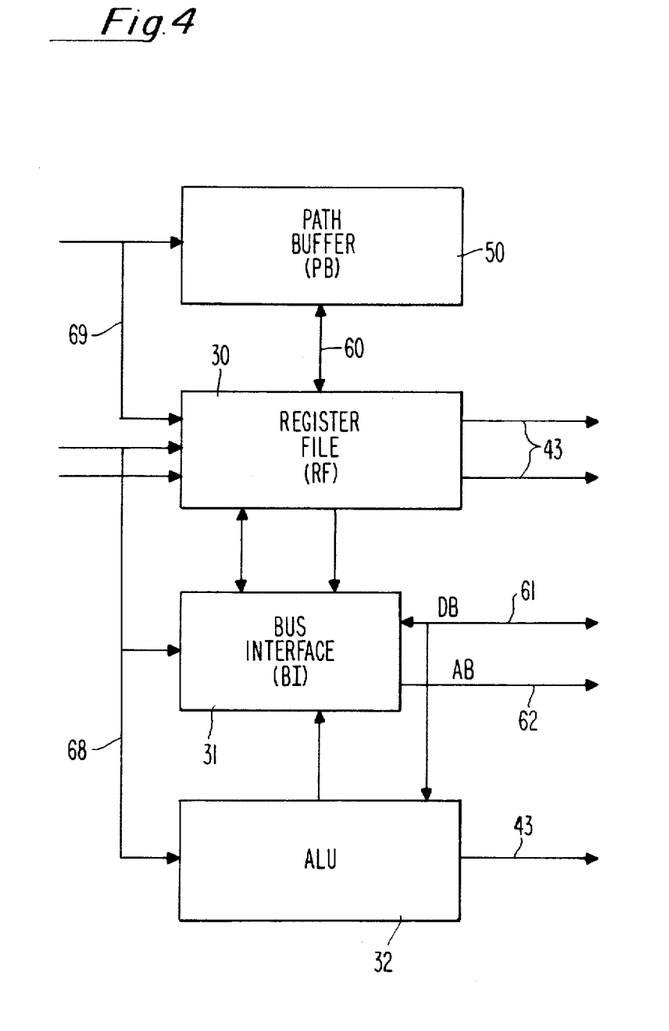
FIG. 4 is a diagram of the data section of the present invention.

The organization of data section 20 of FIG. 3, illustrated in FIG. 4, includes register file 30 which is the primary mechanism for parallel transfer between registers to perform a graph substitution. Also shown in FIG. 4 is path buffer 50, which is a stack memory used to store ancestors of the nodes stored in register file 30. Arithmetic-logic unit 32 of FIG. 4 executes simple arithmetic operators, and bus interface unit 31 communicates with the system memory and other units of the system.

Figure 5:
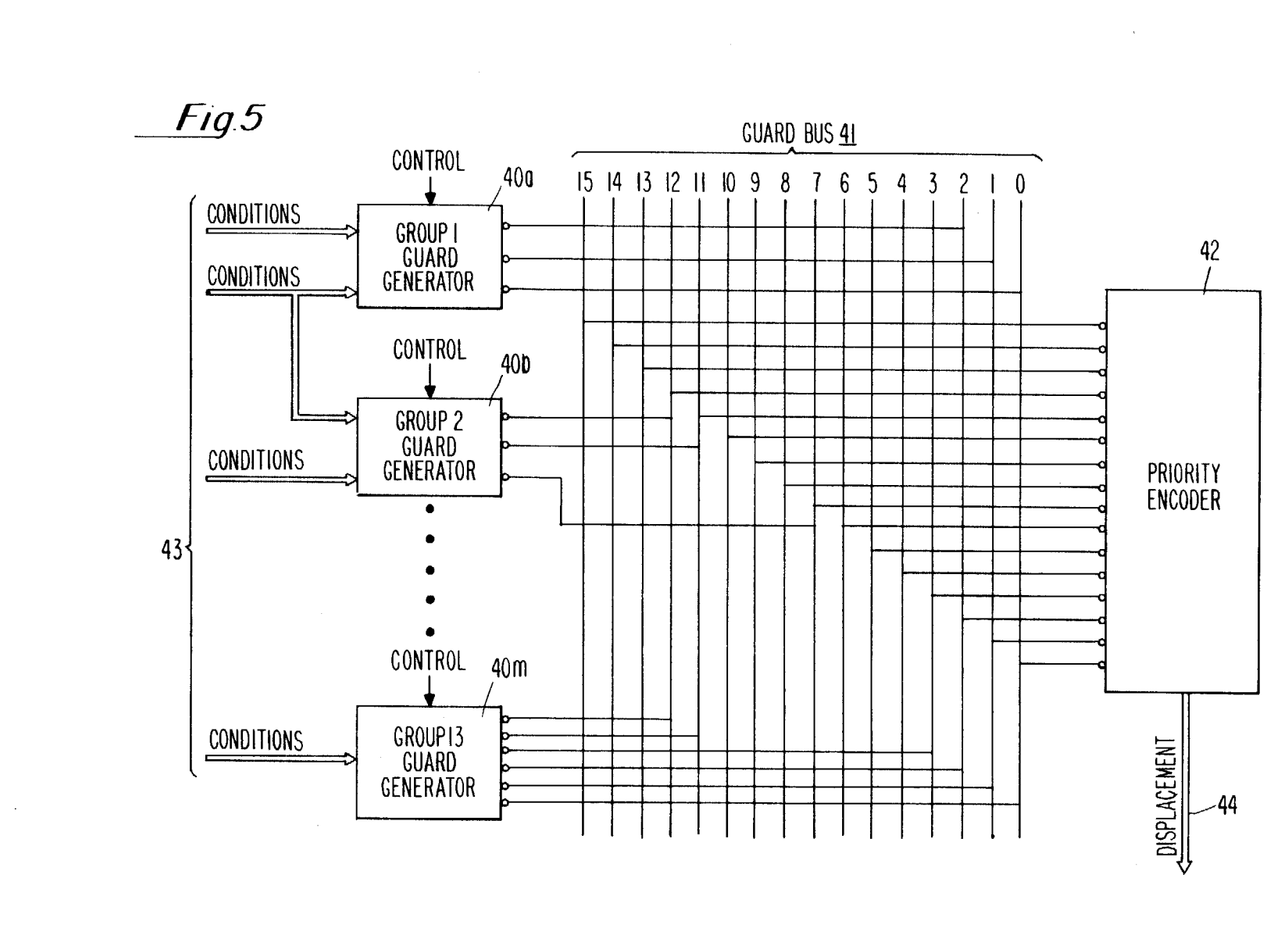
FIG. 5 is a diagram of the condition concentrator of the present invention.

Condition concentrator 21 of FIG. 3 is illustrated in more detail in FIG. 5. It accepts input from register file 30 as well as from arithmetic-logic unit 32, allocator 12, and service processor 13. These inputs are grouped into 13 "condition groups". Each guard generator, 40a–m, maps a condition group to a set of guards. This is described in more detail below. During a test cycle, each guard generator directs a subset of its guards to guard bus 41, which is a 16-line open-collector bus that is the input to priority encoder 42. The output of the priority encoder is 4 bits wide and identifies the highest-priority true guard, where the guard on line 0 has the highest priority and that on line 15 the lowest. This output is used as a displacement value which is concatenated with a base address from control register 22a of FIG. 3 to generate the address of the next microinstruction in control store 22b.

Node Format

Figure 6:
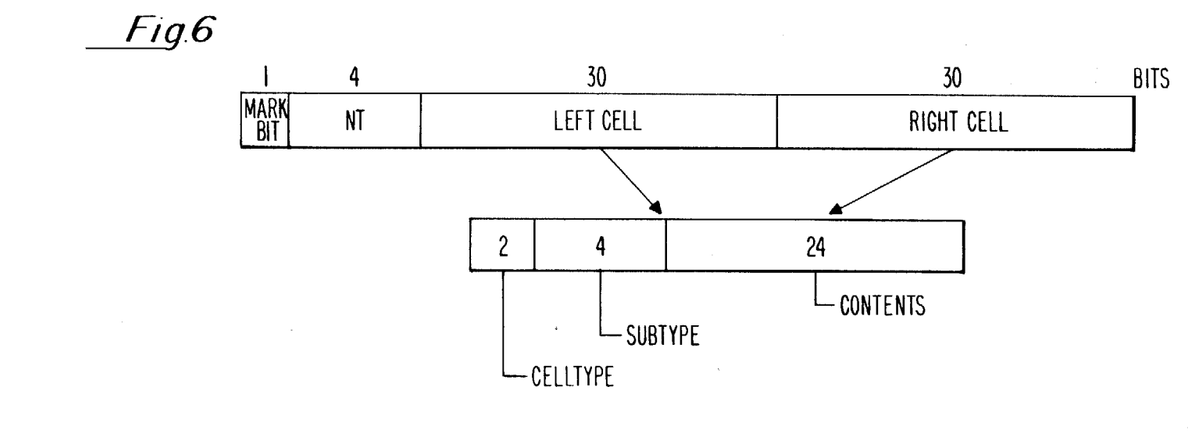
FIG. 6 is a diagram of the format of a node of the type from which graphs are formed.

As indicated above, FIG. 6 illustrates the format in which the nodes of the SK-graph reside in system memory 11, in the various registers of register file 30, and in path buffer 50. Each node contains a node-type field (NT) of four bits, a mark bit and left- and right-cell fields (LC and RC), each of 30 bits. The left- and right-cell fields are further subdivided into a cell-type field (CT) of two bits, a subtype field (ST) of four bits, and a contents field (C) of 24 bits. The various SK operators and values are encoded as combinations of particular values of these fields.

Allocator and System Memory

System memory 11 of FIG. 2 is specifically designed to store node images and their associated mark bits. During SK reduction, nodes are added to and discarded from the graph. The nodes that are added to the graph are called new nodes and the nodes that are discarded from the graph are called garbage nodes. Garbage collection is the process of collecting garbage nodes so that they may be reused as new nodes. The present invention uses a Mark-Scan algorithm that consists of two distinct phases: a mark phase followed by a scan phase.

Each node in memory has an associated mark bit, as was indicated above. During the mark phase, the entire active graph is traversed, setting the mark bit of each node as it is visited. Therefore, at the end of the mark phase, the mark bits associated with the nodes in the graph are set, and all others are reset. During the scan phase, the mark bits for every node in memory are sequentially scanned. When each mark bit is examined once, one of two actions is taken:
  if the mark bit is set, the associated node is in the graph and cannot be reused. The mark bit is reset in preparation for the next marking phase;
  if the mark bit is reset, the associated node may be reused by the reducer. In this case, the address of the node must be "saved" so that it may be issued in response to some future request by the reducer for a new node. These "saved" addresses are termed new node addresses (NNAs).

In traditional implementions, reduction resumes after all mark bits have been examined.

In the present invention, the mark phase is performed by the same processor that performs the reductions, namely graph manager 10 of FIG. 2. However, the scan phase is performed by a special purpose processor, allocator 12. Since the graph manager 10 is not required to perform the scan function, it can resume reduction as soon as it has completed the mark phase. At the same time allocator 12 begins to scan memory in search of unmarked nodes which it then queues for use by the graph manager 12.

Since the scan phase is performed at the same time as the reduction, the effective length of the garbage collection pause for this embodiment is simply the time spent in the mark phase, which is significantly shorter than in the traditional implementation and is only dependent on the size of the graph (not the size of the memory).

As mentioned above, the sole purpose of allocator 12 is to supply graph manager 10 with the addresses of nodes available for reuse during reduction. Allocator 12 locates these nodes by scanning memory for nodes with their associated mark bits reset. The addresses of these nodes are then placed in a queue (the Node Queue) that supplies the graph manager with new node addresses.

During reduction the allocator 12 and the graph manager 10 are both accessing system memory 11: allocator 12 to read and reset mark bits, and graph manager 10 to access nodes. In order to reduce memory contention, a special set of memory operations are available to allocator 12. These operations, which are possible because allocator 12 is concerned only with mark bits and not with node contents, allow access to mark vectors. A mark vector is a bit vector that contains the mark bits of the nodes at eight sequential addresses. Mark vectors can be accessed in one clock, instead of the normal memory access of two clocks. Thus, using the special operations, the allocator can access eight mark bits in one clock instead of sixteen.

Figure 7A:
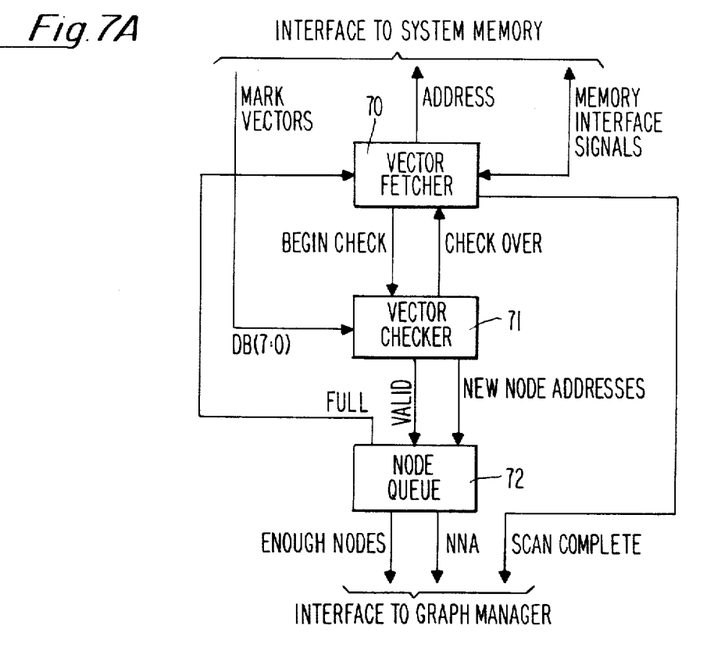
FIG. 7A–C are diagrams detailing the allocator of the present invention.

Allocator 12 of FIG. 2 is illustrated in more detail in FIG. 7A. It consists of three functional units: vector fetcher 70, vector checker 71 and node queue 72. Vector fetcher 70 is illustrated in more detail in FIG. 7B.

Vector fetcher 70 supplies mark vectors to vector checker 71 for processing. Whenever vector checker 71 requests a vector, vector fetcher 70 reads the vector from system memory 11 of FIG. 2 and transfers it to vector checker 71. Next the vector fetcher initiates a memory operation that resets the mark bits in system memory 11 for the mark vector just read. This ensures that all mark bits scanned will be reset when the scan phase is complete. Vector fetcher 70 is illustrated in more detail in FIG. 7B.

Figure 7B:
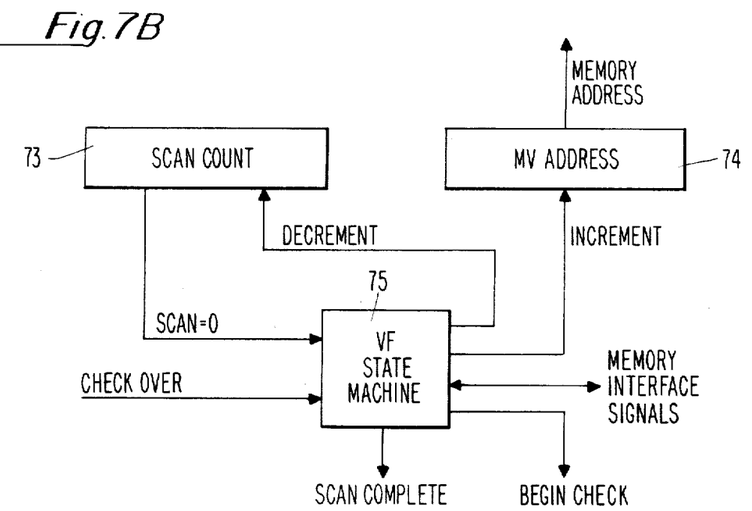

During the mark phase, service processor 13 of FIG. 2 loads scan count register 53 of FIG. 7B with the number of mark vectors to be scanned once the scan phase begins. Each time a mark vector is processed, scan count register 73 is decremented. The fetching of mark vectors terminates and the scan complete signal is asserted when the value of the register equals zero. This register is 21 bits long. Also, during the mark phase, service processor 13 of FIG. 2 loads MV address register 74 with the address of the first mark vector to be scanned once the scan phase begins. The register contains the most significant 21 bits of the address (the least significant three bits always being equal to zero) and is incremented before each new mark vector is read from memory.

Vector fetcher state machine 75 controls the operations of the vector fetcher. As mentioned above, before the scan phase begins MV address register 74 and scan count register 73 are loaded with their initial values. Once the scan phase commences, the vector fetcher state machine reads the mark vector addressed by MV address register 74. Vector fetcher state machine 75 performs this read by manipulating the memory interface signals. When the mark vector is present on data bus DB (7:0), state machine 75 alerts vector checker 71 of FIG. 7A asserting the BEGIN CHECK signal.

Once the mark vector has been received by vector checker 71, state machine 75 executes another memory operation, using the memory interface signals, that resets the mark bits in the mark vector addressed by MV address register 74. Upon completion of the reset operation, state machine 75 remains idle until the CHECK OVER signal from vector checker 71 is asserted indicating that vector checker 71 needs another mark vector. Coincident with the reset operation, state machine 75 increments MV address register 74 and decrements scan count register 73. If scan count register 73 is non-zero another mark vector is fetched as previously described. If the scan count register 73 is zero, the scan complete signal is asserted to the graph manager. If both scan complete is asserted and enough nodes unasserted, the graph manager initiated a garbage collection.

Vector checker 71 produces up to eight node addresses from each vector received. These addresses are added to node queue 72 of FIG. 7A as they are produced. Vector checker 71 requests mark vectors from vector fetcher 70 if the FULL signal from node queue 72 is unasserted. Vector checker 71 of FIG. 7A is illustrated in more detail in FIG. 7C.

Figure 7C:
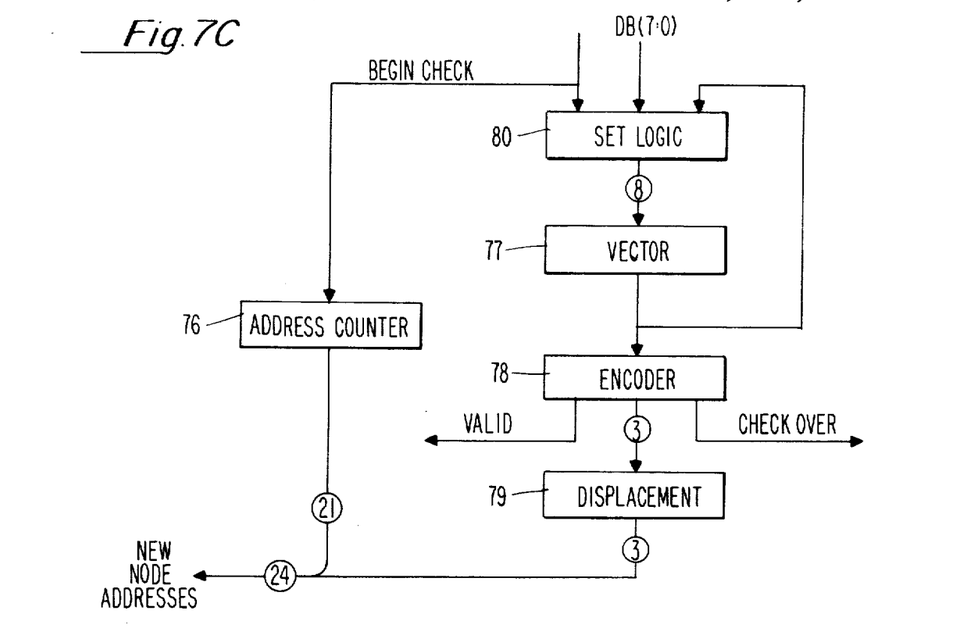

In FIG. 7C, address counter 76 is simply an up counter that contains the most significant 21 bits of the new node address (NNA). Before the scan phase begins, address counter 76 is loaded with a value equal to one less than the MV address register 74 of FIG. 7B. Once the scan phase commences, address counter 76 is incremented and a new mark vector loaded into vector register 77, each time the vector fetcher of FIG. 7A asserts the BEGIN CHECK signal. The vector register 77 is an eight bit wide register. The output of the set logic 80 is the input to this register, the output goes to encoder 78. Encoder 78 generates a three bit displacement based on the value of the vector register 77. The displacement corresponds to the ordinal position of the least significant unmarked bit in the vector. For example, the vector

10010111 will produce a displacement of three. As long as there is at least one unmarked bit in the vector, the new node address VALID signal will be asserted indicating to node queue 72 of FIG. 7A that the new node address from vector check 71 is valid and should be loaded into queue 72. If the output of vector register 77 is all ones, encoder 80 will assert the CHECK OVER signal indicating to the vector fetcher that a new mark vector may be loaded into vector register 77.

Displacement register 79 is a register which contains the least significant three bits of the new node address. It is loaded each time encoder 78 generates a new displacement. The 24 bit new node address is simply the concatenation of the three bit displacement register and the 21 bit address counter 76.

Set logic 80 operates in one of two ways depending on the state of the BEGIN CHECK signal. If the BEGIN CHECK signal is asserted, there is a mark vector present on data bus DB (7:0) to be loaded into vector register 77. Therefore, set logic 80 simply passes the mark vector through unchanged, to be loaded into vector register 77.

If the BEGIN CHECK signal is unasserted, set logic 80 takes the output of vector register 77, sets the least significant zero bit to a one, and supplies a new value to the input of the vector register. For example, if vector register 77 contained the value

10010111 the output of set logic 80 to be loaded into vector register 77 on the next clock, would be

10011111.

To summarize, the value of vector register 77 is changed by set logic 80 on each clock, as long as there is at least one unmarked bit (zero) in the register. For each of the values in vector register 77, encoder 78 generates a new displacement which is loaded into displacement register 79.

Node queue 72 of FIG. 7A is used to store new node addresses for future use by graph manager 10 of FIG. 2. Node queue 72 is 24 bits wide and 256 entries deep. New node addresses are loaded into the queue by vector checker 71 as they are generated and removed from the queue by the graph manager as they are needed.

A counter associated with node queue 72 keeps track of the number of nodes in the queue and is used to generate two signals. The FULL signal is asserted when the queue cannot receive any more new node addresses. The vector fetcher 70 will continue to fetch mark vectors until the FULL signal is asserted at which time it stops requesting mark vectors from the memory. Allocator 12 then becomes temporarily idle, waiting for sufficient room in the node queue to resume.

The ENOUGH NODES signal is asserted when there are nine or more nodes in queue 72. Graph manager 10 tests this signal before performing a combinator to be sure there will be enough new node addresses to complete the execution of the combinator.

Figure 8A:
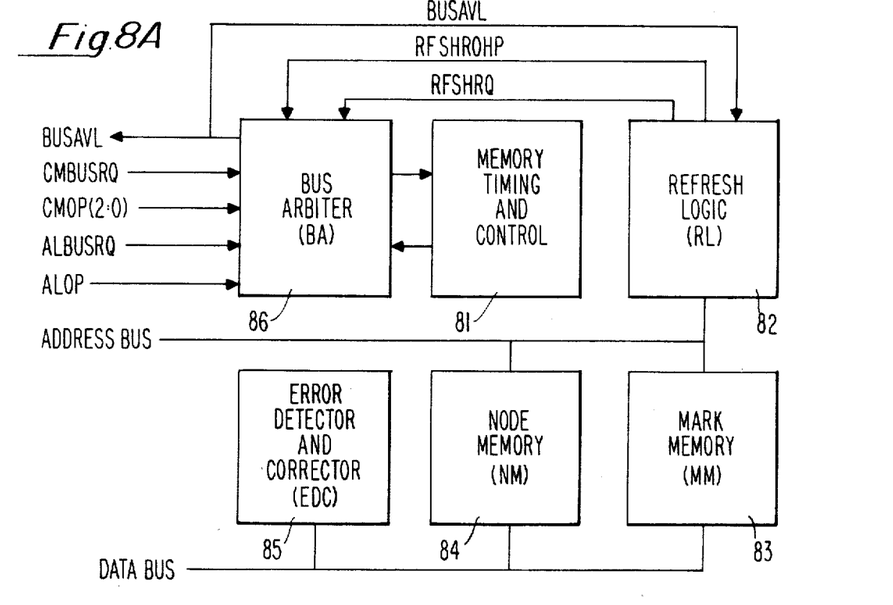
FIGS. 8A and B are diagrams of the system memory of the present invention.

The system memory 11 of FIG. 2 supports a variety of operations for its three requestors: graph manager 10, allocator 13, and refresh logic 82 of FIG. 8A. The number of clocks required for each memory access depends on the type of operation performed. The available memory operations are as follows: Read Node and Mark Bit; Read Node and Mark Bit, then Set Mark Bit; Read Node and Mark Bit, then Reset Mark Bit; Write Node; Read Mark Vector; Reset Mark Vector; Refresh; and No Request.

The purpose of the bus arbiter 86 is to control access to the system bus. The bus actually consists of two buses, a data bus and an address bus. The bus is used to transfer data among the four major functional units of FIG. 2. Most of the transfers on the bus involve the system memory 11. Therefore, for simplicity, access to the bus is allowed only when system memory 11 is ready to execute the next operation (i.e., it is idle). The bus arbiter indicates that the bus is available by asserting the bus available (BUSAVL) signal.

Memory timing and control 81 provides control information and timing signals to the two storage arrays to be described below. The generation of timing and control signals depends on the operation selected.

The mark bits for the nodes are stored in mark memory 83. These mark bits can be accessed in one of two ways depending on the type of operation being performed. Mark memory array 90 of mark memory 83 is shown in more detail on FIG. 8B and is formed of 16K × 1 static RAMs, each having 14 address inputs, a chip enable input, a write enable input, a data input, and a data output. If the chip is selected (i.e. chip enable asserted) and the write enable asserted, the value present at the data input will be stored at the addressed location. If the chip is selected and the write enable unasserted, the value stored at the address location will be present at the data output. If the chip is not enabled, the data output is tristated and the contents of the RAM remain unchanged.

Figure 8B:
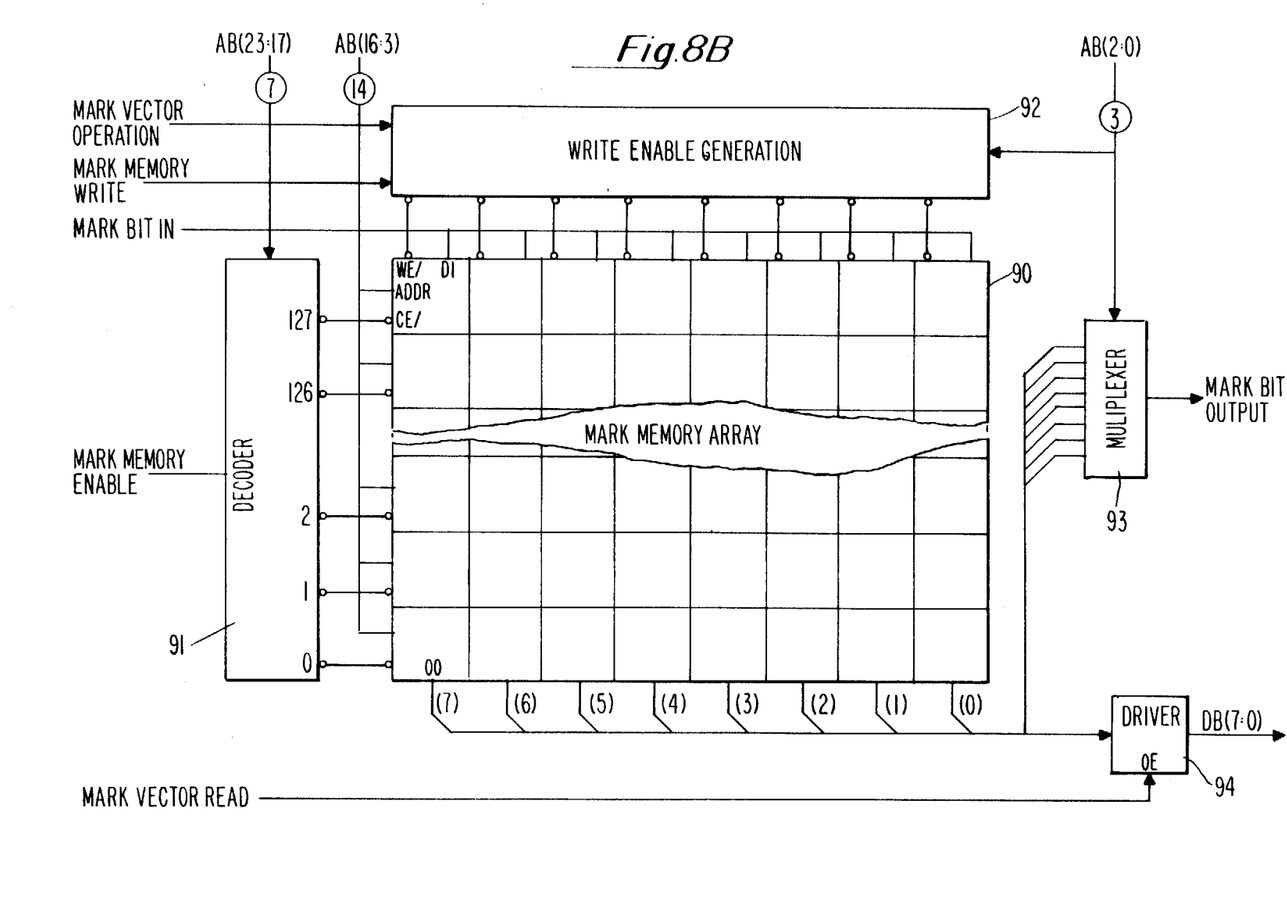

FIG. 8B illustrates functionally how the mark memory is constructed, ignoring the added complexity of board partitioning. Fourteen bits from the address bus AB(17:3) and the MARK BIT IN signal are routed to all the RAMs in the memory array. Each row of eight RAMs has a unique chip enable signal. Each of the eight columns of RAMs has a unique write enable and shared data output line.

Decoder 91 accepts seven binary weighed inputs AB(23:17) and, when enabled, provides 128 mutually exclusive active-lOW outputs (0–127). Decoder 91 is enabled when the MARK MEMORY ENABLE signal is asserted. When decoder 71 is disabled all outputs are unasserted. For example, if the AB(23:17) input to decoder 91 is equal to

0000010 and MARK MEMORY ENABLE asserted, the third least significant output (2) of the decoder would be asserted (LOW) with all others unasserted.

Write enable generator 92 provides eight active-LOW write enable signals that are a function of five input signals. The generator operates one of two ways depending upon the state of the MARK VECTOR OPERATION signal. If the MARK VECTOR OPERATION signal is asserted, write enable generator 72 ignores the AB(2:0) input and asserts all eight write enables when the MARK MEMORY WRITE signal is asserted. If the MARK VECTOR OPERATION signal is unasserted, write enable generator 92 will assert only one of the eight write enables when the MARK MEMORY WRITE signal is asserted. The AB(2:0) lines are decoded to determine which of the eight write enables will be asserted.

Multiplexer 93 selects the value of the MARK BIT OUTPUT signal from one of the data output lines. The AB(2:0) lines are used to determine which of the eight output lines is selected.

Driver block 94 contains eight tristate drivers controlled by the MARK VECTOR READ signal. If the MARK VECTOR READ signal is asserted, the tristate drivers are enabled, gating the value of the eight data output lines onto data bus DB(7:0). If the MARK VECTOR READ signal is unasserted, the drivers are tristated.

When accessing the system memory of FIG. 8A, the graph manager 10 views each mark bit as being stored directly with its associated node—conceptually the sixty-fifth bit of the node. There are two system memory operations that allow the graph manager access to mark memory 83. Both read the mark bit first and then either set or reset it. Although these are considered a single system memory operation, two mark memory operations are actually performed. The mark bit is read and stored during the first clock of the operation and then set or reset during the second clock. The operations performed by mark memory 83, that access only one mark bit, are termed single bit operations. The MARK VECTOR OPERATION SIGNAL will be unasserted for all single bit operations.

The most significant seven bits of the mark memory address AB(23:17) are used by the decoder 91 of FIG. 8B to select one row of RAMs in the memory array 90. The next 14 least significant bits of the address AB(16:3) are used to address a single bit in each of the selected RAMs. The MARK MEMORY WRITE signal will be unasserted enabling the transfer of the eight addressed bits to the data output lines of memory array 90. The least significant three bits of the memory address AB(2:0) are used by the multiplexer to select one of the eight output lines as the source of the MARK BIT OUTPUT signal. The MARK BIT OUTPUT signal goes to the graph manager where it is stored.

The single bit write is used to perform the Mark Memory single bit set and reset operations. The most significant seven bits of the memory address AB(23:17) are used by the decoder 91 to select one row of RAMs in memory array 90. The next 14 least significant bits of the address AB(16:3) are used to address a single bit in each of the eight selected RAMs. The MARK BIT IN signal is a one for a set operation and a zero for a reset operation. The MARK MEMORY WRITE signal will be asserted forcing one of the eight write enable signals to be asserted, thus causing the value of the MARK BIT IN signal to be written into just one of the addressed bits. The least significant three bits of the address AB(2:0) will determine which write enable is asserted.

When accessing system memory 11 of FIG. 2, allocator 12 views each mark bit as being stored in a memory of eight-bit mark vectors. Allocator 12 can read or reset these mark vectors. The addresses supplied by allocator 12 will be multiples of eight, with the least significant three bits always zero. The operations performed by mark memory 83 of FIG. 8A, that access mark vectors, are termed mark vector operations. The MARK VECTOR OPERATION signal will be asserted for all mark vector operations.

The most significant seven bits of the memory address AB(23:17) are used by decoder 91 to select one row of RAMs in the memory array 90. The next 14 least significant bits of the address AB(16:3) are used to address a single bit in each of the selected RAMs. The MARK MEMORY WRITE signal will be unasserted enabling the transfer of the eight addressed bits to the data output lines of memory array 90. The MARK VECTOR READ signal will be asserted gating the value of the eight data output lines through driver 94 onto the least significant eight lines of the data bus DB(7:0). The allocator latches the data on the data bus in the vector checker 71 of FIG. 7A.

A mark vector write is used to perform the mark memory reset operation. The most significant seven bits of the memory address AB(23:16) are used by decoder 91 to select one row of RAMs in memory array 90. The next 14 least significant bits of the address AB(16:3) are used to address a single bit in each of the eight selected RAMs. The MARK BIT IN signal is a zero for the reset operation. The MARK MEMORY WRITE signal will be asserted forcing all eight write enable signals to be asserted thus causing the value of the MARK BIT IN signal to be written into all eight of the addressed bits. This will reset the addressed mark vector.

Node memory 84 of FIG. 8A is a conventional memory, one node wide. It also contains eight check bits per node for error correction. Error detector and corrector 85 is to detect and correct any errors that may develop in node memory 84. This is done by storing eight check bits with each 64 bit word. Using these check bits, all single-bit errors can be corrected: all double and some multiple-bit errors can also be detected.

The error correction will be done "on the side" for maximum performance. This means that uncorrected data will be routed directly back to the requestor while at the same time being checked by the EDC. If an error is detected the memory cycle will be extended so that the data correction can be performed. Since the probability of an error is small, the cycle is rarely extended and the memory works at the same speed as an uncorrected memory.

EPILOGUE

An allocator and system memory have been described above for a reduction processor which evaluates programs stored as binary graphs employing variable-free applicative language codes. These graphs are made up of nodes which are physically storage locations in the system memory and the reduction processor requires new nodes and also discards nodes or storage locations during its reduction process. Each node as it exists in memory contains as its most significant bit a mark bit which when set indicates that the node is being used in a graph and when reset indicates that the node or storage location is available for future use by the graph manager.

The graph manager and the allocator operate together with the graph manager marking the various nodes as they are stored in memory for use in the reduction process while the allocator scans selected groups of storage locations to see if there are any unused storage locations and then places the addresses of those unused storage locations in a queue for use by the graph manager. In order to accommodate the scanning of a number of storage locations in parallel, the system memory is divided into a node memory and the mark bit memory so that the mark bits for a number of sequential storage locations can be examined in parallel to determine which node locations are free for use by the graph manager.

While but one embodiment of the present invention has been disclosed, it will be apparent to those skilled in the art that variations and modifications may be made therein without departing from the spirit and scope of the invention as claimed.

What is claimed is:

1. In a processing system having a memory with a plurality of storage locations, each storage location having a mark bit position which when set indicates that the storage location has been allocated for use and when reset indicates that the storage location is available for use, allocation means comprising:
   mark bit addressing means coupled to said memory to fetch in parallel mark bits from a plurality of sequential storage locations, said fetched mark bits forming a mark bit vector;
   checking means coupled to said mark bit addressing means for checking said mark bit vector for reset marked bits; and
   address formation means for forming addresses for those storage locations represented by the reset mark bits in said mark bit vector.

2. Allocation means according to claim 1 further including:
   queuing means coupled to said address formation means for receiving said formed storage location addresses.

3. Allocation means according to claim 1 wherein:
   said mark bit addressing means includes reset means coupled to said mark bit positions in said storage locations to reset those mark bits that were fetched in parallel.

4. Allocation means according to claim 3 wherein:
   said mark bit addressing means includes scan count means to receive a count of the number of mark bit vectors that are to be fetched from said storage locations.

5. Allocation means according to claim 4 further including:
   means to increment said mark bit addressing means and to decrement said scan count means after the fetch of each plurality of mark bits forming a mark bit vector.

6. In a processing system having a memory which has a plurality of storage locations, each storage location having a mark bit position which when set indicates that the storage location has been allocated and which when reset indicates that the storage location is available for use, the combination comprising:
   mark bit setting means coupled to said storage locations to set selected mark bits so as to allocate those storage locations;
   mark bit addressing means to fetch in parallel mark bits from a plurality of sequential storage locations which selected mark bits form a mark bit vector;
   checking means coupled to said mark bit addressing means to check said mark bit vector for reset mark bits; and
   address generating means to generate addresses for those storage locations represented by said reset mark bits.

7. The combination according to claim 6 further including:
   queing means coupled to said address generating means for receiving said generated storage location addresses.

8. Combination according to claim 6 wherein:
   said mark bit addressing means includes reset means coupled to said mark bit positions in said storage locations to reset those mark bits that were fetched in parallel 9. Combination according to claim 8 wherein:
   said mark bit addressing means includes scan count means to receive a count of the number of mark bit vectors that are to be fetched from said storage locations.

10. Combination according to claim 9 further including:
    means to increment said mark bit addressing means and to decrement said scan count means after the fetch of each plurality of mark bits forming a mark bit vector.

* * * * *